June 14, 1927.

E. ANDERSON

VEHICLE SIGNAL

Filed May 25, 1925

Edgar Anderson,
INVENTOR

BY Victor J. Evans,
ATTORNEY

WITNESS:

June 14, 1927.
E. ANDERSON
VEHICLE SIGNAL
Filed May 25, 1925
1,632,689
3 Sheets-Sheet 2
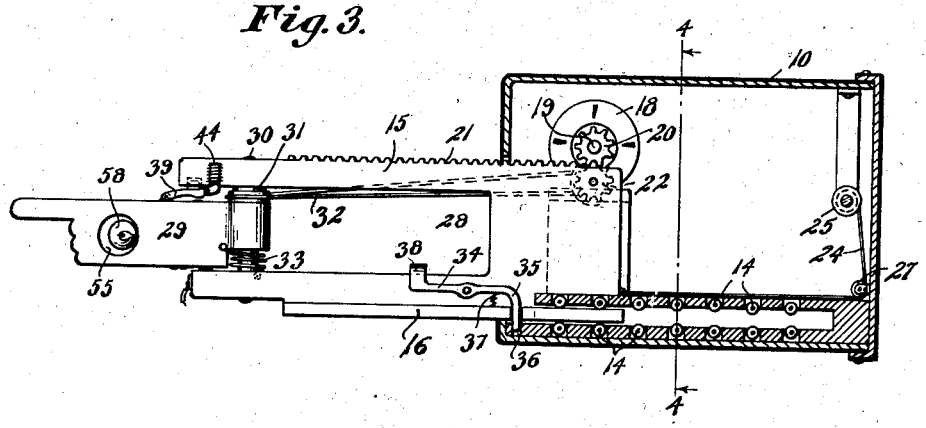
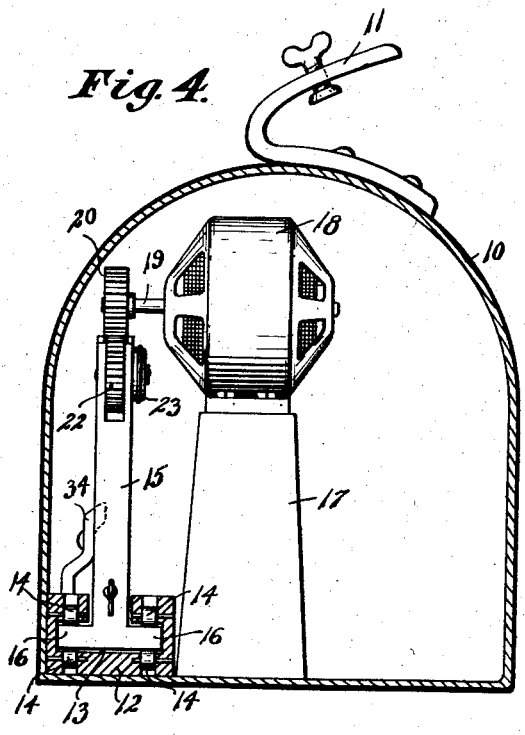
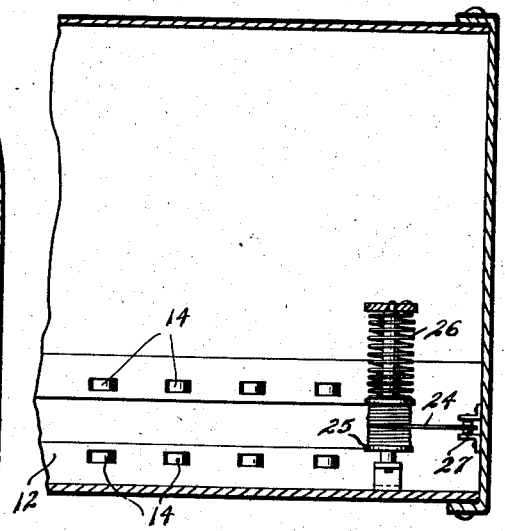
Edgar Anderson,
INVENTOR
BY Victor J. Evans,
ATTORNEY
WITNESS:

June 14, 1927.

E. ANDERSON 1,632,689

VEHICLE SIGNAL

Filed May 25, 1925

Edgar Anderson,
INVENTOR

BY Victor J. Evans,
ATTORNEY

WITNESS:

Patented June 14, 1927.

1,632,689

UNITED STATES PATENT OFFICE.

EDGAR ANDERSON, OF WAKEFIELD, NEBRASKA.

VEHICLE SIGNAL.

Application filed May 25, 1925. Serial No. 32,791.

This invention relates to signal devices, particularly those designed for use upon motor vehicles and the like, and has for its object the provision of a novel device which is electrically operated and by means of which the driver of a vehicle may give a visible signal to the drivers of following and approaching vehicles, traffic officers, pedestrians and in fact all interested parties as to a contemplated turn to the left, the device being consequently a great safeguard and acting to prevent likelihood of collisions and traffic congestion.

An important object is the provision of a device of this character which is so constructed and arranged as to be set in operation merely by touching a push button, this being a very safe arrangement inasmuch as it is unnecessary for the operator to remove his hands from the steering wheel as is the case when the ordinary arm signal is given.

Another object is the provision of a device of this character in which the movement of the various parts is controlled by an electric motor interposed in circuit with a suitable push button within easy reach of the operator, the device being furthermore equipped with an automatic circuit breaker which will act to cut off the motor when the signal has reached its operative position.

A still further object of the invention is to provide a device of this character which is provided with an automatically acting circuit maker so as to cause energization of an incandescent bulb when the signal reaches signaling position, this feature making the device equally effective by night as by day.

Yet another object is the provision of a device of this character which is easily capable of being manufactured and sold as a complete and separate entity adapted for attachment upon already existing automobiles or other vehicles without involving any changes in the construction thereof, the device being moreover comparatively simple and inexpensive in manufacture, easy in installation, positive in action, efficient and durable in service, and a general improvement in the art.

With the above and other objects and advantages in view, the invention consists in the details of construction and arrangement and combination of parts to be hereinafter more fully described and claimed, and illustrated in the accompanying drawings, in which:

Figure 3 is a longitudinal section through the device showing it in extended or signaling position.

Figure 4 is a cross section taken on the line 4—4 of Figure 3.

Figure 5 is a detail horizontal section.

Figure 1:
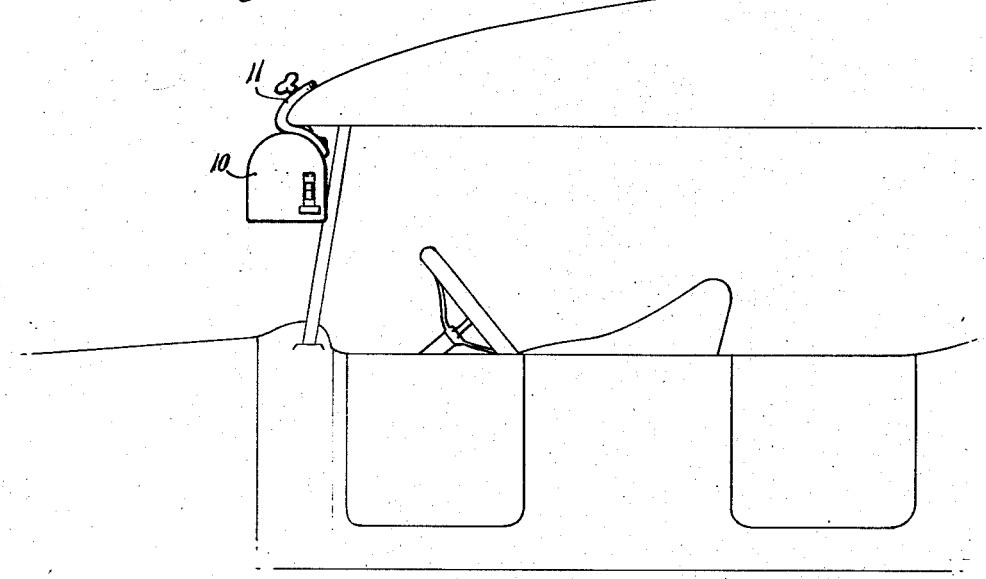
Figure 1 is a side elevation of an automobile equipped with my device.
Figure 2:
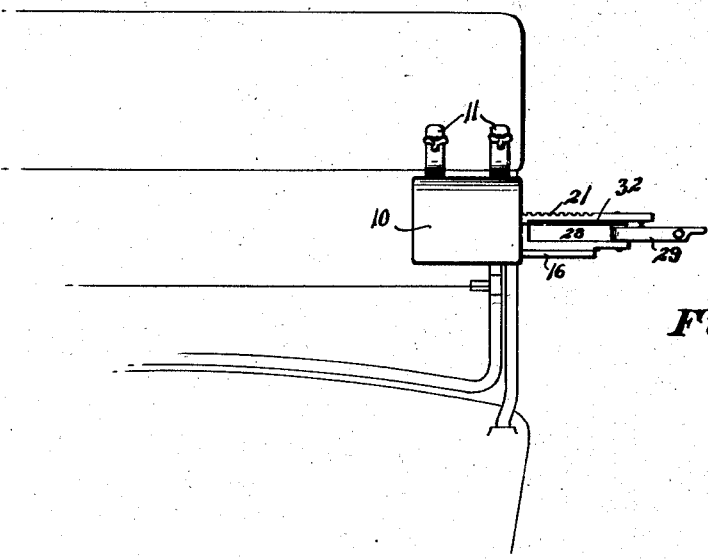
Figure 2 is a front elevation thereof.
Figure 6:
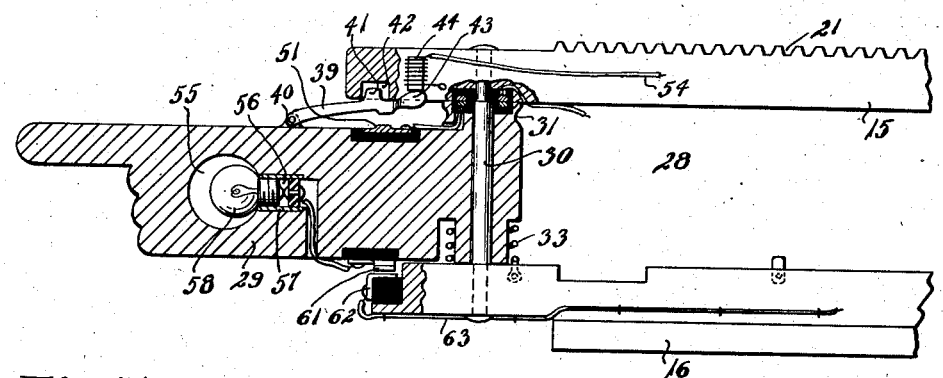
Figure 6 is a longitudinal section through a portion of the device removed from its casing and showing the circuit control means.
Figure 7:
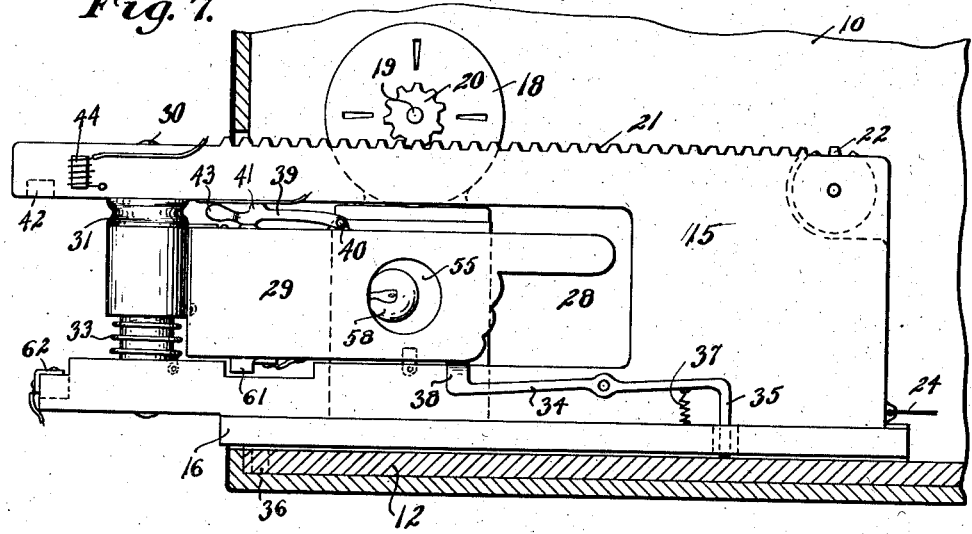
Figure 7 is a fragmentary longitudinal section through the device showing the signal member in entirely retracted position.
Figure 8:
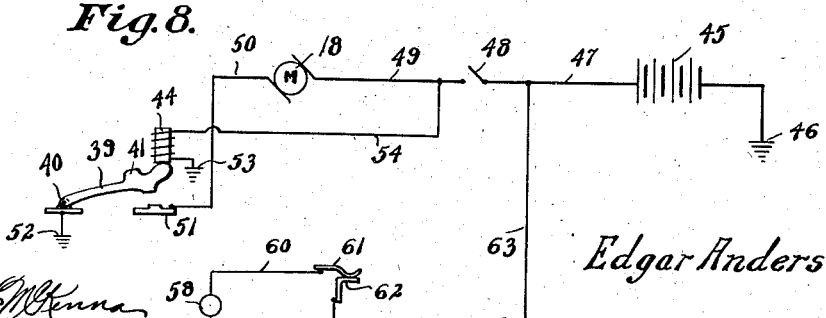
Figure 8 is a diagram of the electric circuit.

Referring more particularly to the drawings, I have shown the device as comprising a suitable casing 10 which may be of any desired size, shape and material, and which may be provided with any suitable means such as that indicated at 11 whereby to effect mounting upon the top, windshield or other suitable portion of an automobile. Located within the bottom portion of the casing and held in any desired manner is a guide 12 having a T-shaped slot 13 therein and equipped with a plurality of rollers 14 located at the top and bottom of the slot. The slot is of such formation that its vertical portion extends upwardly through the top of the guide. Slidably mounted for longitudinal movement within the casing is one section 15 of the signal arm, this section extending through the vertical portion of the T-shaped slot in the guide and having its lower edge formed with horizontally extending lateral flanges 16 engaging between the upper and lower rollers in the guide whereby the member 15 will have free and almost frictionless movement.

Mounted within the casing upon a suitable standard 17 is an electric motor 18 of any desired type having its shaft 19 carrying a pinion 20 adapted to coact with a rack 21 formed or secured upon the upper edge of the arm section 15. The rack 21 does not extend the full length of the arm section 15 and journaled at the inner upper corner of this arm section is a pinion 22 carrying a grooved pulley 23. The arrangement is such that when the motor is energized and the pinion 20 has moved the arm section 15 to its outermost position the pinion 20 will then engage the pinion 22 and effect rotation of the pulley 23 for a purpose to be described.

Ordinarily, the arm section 15 is held in its retracted position by means of a cord or other flexible member 24 secured to and wrapped about a drum 25 with which is connected a spring 26 which acts normally to maintain the drum in a certain position. The flexible member 24 is trained over a suitable guide roller or pulley 27, and is connected with the rear or inner end of the arm section 15.

The outer end portion of the arm section 15 is formed with an opening 28 within which is ordinarily located a signal member 29 formed preferably as the representation of a human hand although of course capable of being formed as any other type of pointer. This member 29 is pivoted by means of a transverse bolt or the like 30 so as to be capable of swinging outwardly into extended position by means to be described. This member 29 carries a pulley or drum 31 about which is trained a flexible member 32 which is also trained about the pulley 23 so that when the gear 22 is rotated the member 29 will be swung in one direction or the other.

For normally holding the member 29 in its inoperative position within the opening 28, use may be made of a coil spring 33 connected at one end with the member 15 and at its other end with the pivoted end portion of the member 29.

The member 15 is of course moved into extended position by rotation of the motor and for holding it in such extended position I provide a catch device formed with an elongated member 34 pivoted intermediate its ends upon the member 15 and having a lateral end portion 35 adapted to engage within a notch 36 in the bottom of the casing 10 or in the bottom portion of the guide 12 therein. A coil spring 37 acts to urge this lateral end into engagement with the notch. The other end of the member 34 terminates in a wedge or cam shaped head 38 extending into the opening 28 in position to be engaged by the member 29 when the latter is swung to be located within the opening 28. When the arm member 15 is pulled outwardly by the motor it is obvious that the end 35 of the catch will engage within the notch 36 and hold the arm extended.

Similarly, holding means must be provided for the swingable member 29 and in carrying out this feature I provide a catch 39 pivoted at 40 upon the member 29 and having a lateral or upward extension 41 adapted to be engaged within a recess 42 in the upper portion of the arm member 15 and communicating with the opening 28. The end of the arm or latch 39 carries an armature 43 so positioned as to be attracted by a small electro-magnet 44 mounted within the member 15 above the opening 28 therein.

This magnet is connected in parallel with the motor as will be explained.

The electrical features of the device are as follows: The numeral 45 designates a suitable source of current which may be the storage battery of the car, which source of current has one terminal grounded as at 46. Connected with the other terminal is a wire or other conductor 47 leading to a push button or other switch 48 which is connected by a wire 49 with one terminal of the motor 18. Leading from the other terminal of the motor is a wire 50 which connects with a contact 51 mounted on the upper edge of the swingable signal member 29 and normally engaged by the latch 39. This latch is grounded at 52 being normally depressed and in operation relative to the magnet 44 which when the circuit controller is operated and the motor set into operation drives out the semaphore and when fully extended brings the latch 39 into operative relation to the magnet and cuts out the motor. One terminal of the winding of the electro-magnet 44 is grounded at 53 while the other terminal is connected by a wire 54 with the wire 49 leading through the push button 48 to the source of current.

In order that the device may be used satisfactorily at night, the swingable member 29 is shown as provided with an opening 55 leading into a recess 56 within which is mounted a suitable socket 57 for an incandescent lamp 58 of the single terminal type. One terminal of the lamp or lamp socket is grounded at 59 while the other terminal is connected by a wire 60 with a contact 61 mounted on the lower edge of the member 29 in position to engage against a stationary contact 62 mounted at the outer lower end of the member 15 when the member 29 is swung into its extended position. The contact 62 has connected therewith a wire 63 which connects with the wire 47 so that the lamp will burn continuously.

In the operation of the device, it will be seen that whenever the driver of the vehicle contemplates making a turn to the left or stopping suddenly it is merely necessary that he press upon the push button 48. When this is done the motor 18 and magnet 44 will be energized. As the motor armature revolves the pinion 20 carried by its shaft and meshing with the rack 21 will operate to slide the signal arm member 15 out of the casing 10 into its projected or extended position. When this member reaches the outer limit of its movement the signal arm will swing 90° and the angular end 35 of the latch 34 will align with and drop into the notch 36 and prevent the member 15 from being drawn back by the flexible member 24 and spring roller. Just as soon as the member 15 reaches its outermost position the rack 21 has gone past the pinion 20 and the pinion 22 is brought into engagement with the pinion 20 whereupon the roller 23 will be rotated. The rotation of this roller causes movement of the belt or flexible member 32 and the result will be that the arm member 29 is swung horizontally out of the opening 28 into its extended position. As stated above, the electro-magnet 44 is energized and just as soon as the member 29 reaches a position where the armature 43 is located adjacent the electro-magnet the electro-magnet attracting this armature will lift the latch member 39 out of engagement with the contact 51, thereby immediately breaking the circuit to the motor. When the latch member 39 is thus drawn upwardly the extension 41 thereon engaging within the recess 42 will act to hold the member 29 in its extended and signaling position. As soon as the member 29 has reached its signaling position the contact 61 carried thereby will engage against the contact 62 carried by the lower outer corner of the member 15 so that the circuit will be closed through the lamp 58. The display of this light will make the signal very conspicuous both at night and at day so that there will be no likelihood of the signal being overlooked. Attention is directed to the fact that the device will remain in signaling position as long as the operator holds the push button 48 depressed inasmuch as the energization of the electro-magnet 44 will maintain the latch 39 in its operative position holding the parts against movement.

When the contemplated turn has been made and the operator wishes to discontinue giving the signal it is merely necessary that he release the pressure upon the push button 48, whereupon the electro-magnet 44 becomes de-energized, permitting the latch member 39 to drop down out of the recess 42 and into its normal position resting upon the upper edge of the member 29. The coil spring 33 will then operate to swing the member 20 horizontally into its inoperative position within the opening 28 in the member 15. When this swinging movement occurs the lower edge of the member 29 will strike against the wedge or cam-like head 38 of the latch member 34 and swing the latch member in such a way that the rear angular end 35 thereof will be disengaged from the notch 36. When this occurs there is then nothing to hold the member 15 in position and the flexible member 24 connected therewith and trained about the spring roller will operate to retract the member 15 into the casing 10.

From the foregoing description and a study of the drawings, it will be apparent that I have thus provided a simply constructed, inexpensive and yet highly efficient signal device which is purely electrically operated and which will relieve the driver of a vehicle of the necessity for holding out his hand as a signal that he intends to turn or stop. It is believed that the construction, operation and advantages will be readily apparent to one skilled in the art without further elaboration.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In a signal device of the character described, a casing, an arm member slidably mounted within the casing and adapted to be moved into projected position, motor operated means for moving said arm member, a second member hingedly mounted upon said first named member and swingable horizontally into extended position, and means operated at the completion of the projecting movement of the first named member for swinging the second named member.

2. In a device of the character described, a casing, an arm member slidably mounted within said casing and adapted to be projected therebeyond, a rack carried by said member, an electric motor within the casing having its shaft carrying a pinion meshing with said rack, a second member pivotally mounted upon said first named member and normally contained there-within and means operable by the motor when the first named member reaches its projected position for swinging the second named member into extended position.

3. In a device of the character described, a casing, an arm member slidably mounted within said casing and adapted to be projected therebeyond, a rack carried by said member, an electric motor within the casing having its shaft carrying a pinion meshing with said rack, a second member pivotally mounted upon said first named member and normally contained there-within and means operable by the motor when the first named member reaches its projected position for swinging the second named member in an extended position, said means comprising a pinion carried by the first named member at the end of the rack, a pulley carried by said last named pinion, a pulley on said second named member at its pivot, and a flexible member trained about said pulleys.

4. In a device of the character described, a casing, an arm member slidably mounted within said casing and adapted to be projected therebeyond, a rack carried by said member, an electric motor within the casing having its shaft carrying a pinion meshing with said rack, a second member pivotally mounted upon said first named member and normally contained there-within, means operable by the motor when the first named member reaches its projected position for swinging the second named member in an extended position, said means comprising a pinion carried by the first named member at the end of the rack, a pulley carried by said last named pinion, a pulley on said second named member at its pivot, a flexible member trained about said pulleys, spring means connected with said first named member and normally maintaining it in retracted position within the casing, and spring means connected with said second named member and normally holding it confined within the first named member.

5. In a device of the character described, a casing, an arm member slidably mounted within said casing and adapted to be projected therebeyond, a rack carried by said member, an electric motor within the casing having its shaft carrying a pinion meshing with said rack, a second member pivotally mounted upon said first named member and normally contained there-within and means operable by the motor when the first named member reaches its projected position for swinging the second named member in an extended position, said means comprising a pinion carried by the first named member at the end of the rack, a pulley carried by said last named pinion, a pulley on said second named member at its pivot, a flexible member trained about said pulleys, an electro-magnet carried by said first named member, a pivoted latch carried by the second named member and positioned to be attracted and engaged by the electro-magnet for holding the second named member in extended position.

6. In a device of the character described, a casing, an arm member slidably mounted within said casing and adapted to be projected therebeyond, a rack carried by said member, an electric motor within the casing having its shaft carrying a pinion meshing with said rack, a second member pivotally mounted upon said first named member and normally contained there-within, means operable by the motor when the first named member reaches its projected position for swinging the second named member in an extended position, said means comprising a pinion carried by the first named member at the end of the rack, a pulley carried by said last named pinion, a pulley on said second named member at its pivot, a flexible member trained about said pulleys, an electro-magnet carried by said first named member, a pivoted latch carried by the second named member and positioned to be attracted and engaged by the electro-magnet for holding the second named member in extended position, and a circuit breaker interposed in the electric motor circuit and including said latch, whereby to cut out the motor when the second named member reaches extended position.

In testimony whereof I affix my signature.

EDGAR ANDERSON.